F. O. BEAN.
VEHICLE SAFETY SIGNAL LIGHT.
APPLICATION FILED MAY 9, 1913.
1,120,589.
Patented Dec. 8, 1914.
2 SHEETS—SHEET 1.
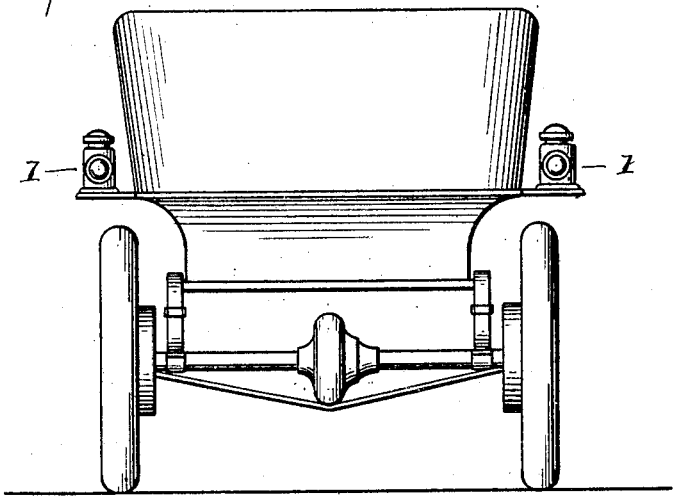
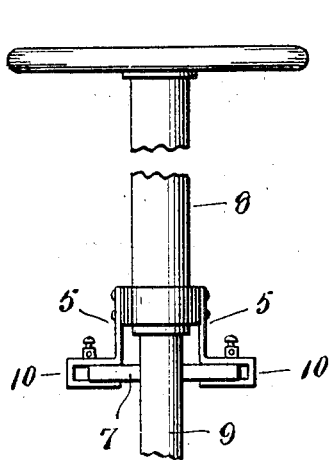
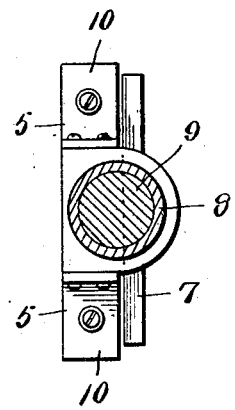
Witnesses
E. R. Ruppert
U. B. Hillyard
Inventor
F. O. Bean
By Victor J. Evans
Attorney

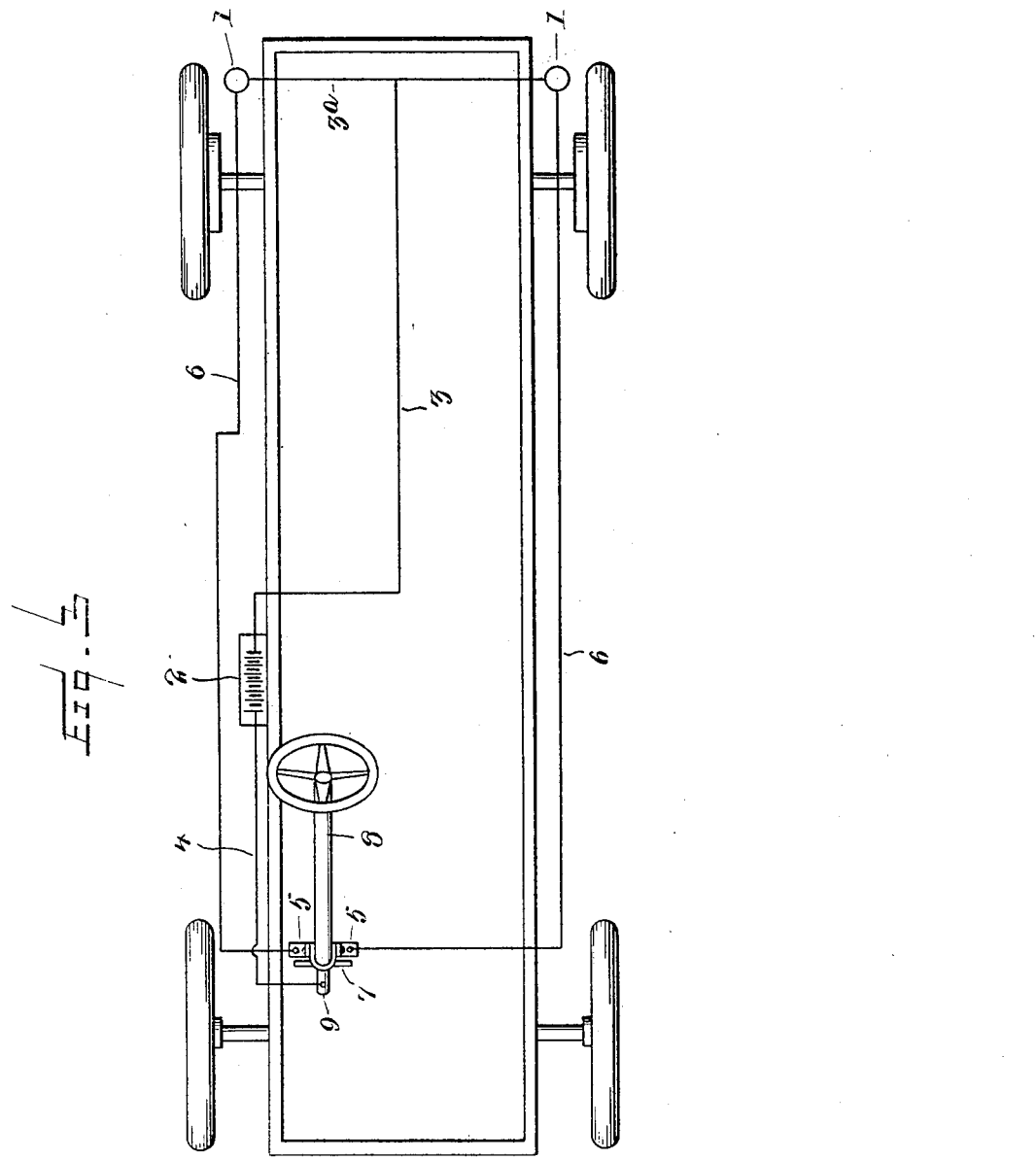

UNITED STATES PATENT OFFICE.

FRANK O. BEAN, OF SOMERSWORTH, NEW HAMPSHIRE.

VEHICLE SAFETY SIGNAL-LIGHT.

1,120,589.　　　　Specification of Letters Patent.　　Patented Dec. 8, 1914.

Application filed May 9, 1913. Serial No. 766,619.

*To all whom it may concern:*

Be it known that I, FRANK O. BEAN, a citizen of the United States, residing at Somersworth, in the county of Strafford and State of New Hampshire, have invented new and useful Improvements in Vehicle Safety Signal-Lights, of which the following is a specification.

The primary purpose of the invention is to devise means for preventing rear end collision of vehicles, such as result from the vehicle in the lead turning suddenly from a straight course, as when rounding a corner or making a turn.

The invention provides a safety signal be located upon opposite sides of a vehicle, said tail lights having connection with the steering mechanism of the vehicle in such a manner that when the vehicle is moving straight ahead both of such lights are extinguished, but when the vehicle makes a turn to the right or left the corresponding light is brought into play to give ample warning to any vehicle following as to the direction of turn intended to be made by the vehicle in the lead, with the result that the operator of the following vehicle is warned in ample time to prevent running into the vehicle ahead.

The invention provides a safety signaling means embodying electric lamps and connections, the latter including a circuit closer which is connected with and actuated by means of the steering mechanism so that when the machine or vehicle makes a turn to the right the lamp on the right hand side is caused to shed beams of light to indicate to the operator of a vehicle in the rear that the preceding vehicle is about to turn to the right and in the event of the vehicle in the lead making a turn to the left the left hand light gives warning by its illumination that the intention of the operator of the vehicle in the lead is to make a turn to the left, so that a warning may be given at night to prevent rear end collision of vehicles and automobiles chiefly in the manner hereinbefore stated.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a rear view of a vehicle of the automobile type provided with a safety light signal mechanism embodying the invention. Fig. 2 is a detail view, showing the steering post, the casing or column therefor and the circuit closer for the lamp circuits. Fig. 3 is a top plan view of the chassis of an automobile, showing the tail lights, electric circuits, battery and circuit closer. Fig. 4 is a detail view of the circuit closer, showing the parts on a larger scale.

Corresponding and like parts are referred to in the following description, and indicated in all the views of the drawings, by the same reference characters.

The numeral 1 designates two tail lamps such as are commonly provided for vehicles. These lamps are arranged upon opposite sides of the vehicle and preferably are of the electric variety so as to be lighted by closing an electric circuit. So far as the present invention is involved the lamps 1 may be mounted in any manner and are included in electric circuits each having a circuit closer so that only one lamp at a time may be lighted. The circuit closer provided in the present instance is of the duplex variety, that is it embodies one movable element which is constructed and arranged to coöperate with independent contacts whereby the circuit of one lamp or the other may be closed according to the direction of movement of the vehicle when making a turn.

The numeral 2 indicates a battery or other source of supply of the electric fluid, said battery being included in both lamp circuits. Conducting wires 3 and 3ª connect one pole of the battery 2 with one of the lamp terminals. Another wire 4 connects the other pole of the battery with a relatively movable contact 7. A wire 6 connects the other terminal of each of the lamps 1 with a fixed contact 5, the latter being constructed and arranged to make electric connection with one or the other of the ends of the contact 7 so as to complete or close the circuit of one or the other of the lamps according to the direction of travel of the vehicle.

The relatively fixed contacts 5 are of like or similar construction and are secured to the column or casing 8 through which the steering rod 9 passes. The contacts 5 while secured to the part 8 are electrically insulated therefrom. Each of the contacts 5 embodies a shank and a loop shaped portion 10, the contacts being attached by means of their shanks to the casing 8. The movable contact 7 consists of a rod or bar which is secured at a middle point to the steering rod 9. The rod 7 is arranged opposite the spaces formed between the parallel members of the loops 10. When the steering rod 9 is turned to cause the vehicle to travel in one direction the contact 7 makes electric connection with one or the other of the contacts 10, thereby closing the lamp circuit corresponding with the direction of turn of the vehicle so as to light the lamp on the same side of the vehicle and thereby give warning to the vehicle in the rear so that the operator may govern himself in order to avoid a rear end collision. When the steering rod 9 is turned in the opposite direction the lamp circuit previously closed is broken and the other lamp circuit is closed, thereby lighting the lamp on the opposite side of the vehicle. When the vehicle is traveling straight ahead both lamp circuits are broken and both tail lamps are extinguished.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In a vehicle embodying a steering mechanism including a steering rod and a casing therefor, two tail lamps each included in an electric circuit, contacts for such lamp circuits secured to the casing of the steering rod but electrically insulated therefrom, such contacts being opposed and each consisting of a shank and a loop and arranged with the open sides of the loops facing inward, and a second contact consisting of a bar attached to the steering rod and movable therewith and forming the other terminal of each of the lamp circuits and adapted to close one or the other of such lamp circuits according to the direction of travel of the vehicle when the steering rod is moved to cause a turning of the vehicle.

In testimony whereof I affix my signature in presence of two witnesses.

FRANK O. BEAN.

Witnesses:
WENA LAWSON,
ERNEST H. PARKER.